(12) United States Patent
Satzger et al.

(10) Patent No.: US 9,751,382 B2
(45) Date of Patent: Sep. 5, 2017

(54) VEHICLE WITH A HEATING DEVICE

(71) Applicant: Bayerische Motoren Werke Aktiengesellschaft, Munich (DE)

(72) Inventors: Peter Satzger, Landsberg am Lech (DE); Juergen Glaesser, Eching (DE); Christina Selmeier, Wolnzach (DE); Robert Herbolzheimer, Groebenzell (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 9 days.

(21) Appl. No.: 14/961,955

(22) Filed: Dec. 8, 2015

(65) Prior Publication Data

US 2016/0167483 A1 Jun. 16, 2016

Related U.S. Application Data

(63) Continuation of application No. PCT/EP2014/064276, filed on Jul. 4, 2014.

(30) Foreign Application Priority Data

Jul. 25, 2013 (DE) .................. 10 2013 214 550

(51) Int. Cl.
*B60H 1/00* (2006.01)
*B60H 1/22* (2006.01)
(Continued)

(52) U.S. Cl.
CPC ......... *B60H 1/2225* (2013.01); *B60H 1/2215* (2013.01); *F24H 3/0429* (2013.01); *H05B 3/0042* (2013.01); *H05B 2203/032* (2013.01)

(58) Field of Classification Search
CPC ... B60H 1/2215; B60H 1/2225; F24H 3/0429; H05B 3/0042; H05B 2203/032
(Continued)

(56) References Cited

U.S. PATENT DOCUMENTS 3,434,818 A * 3/1969 Chauvin .................. F21K 5/02
392/421
3,619,555 A 11/1971 Bassett, Jr.
(Continued)

FOREIGN PATENT DOCUMENTS

CN 1525795 A 9/2004
CN 202085910 U 12/2011
(Continued)

OTHER PUBLICATIONS

DE102012205873A1, Meier et al, Oct. 2013, "Infrared Heating Device," partial translation.*
(Continued)

*Primary Examiner* — Joseph M Pelham
(74) *Attorney, Agent, or Firm* — Crowell & Moring LLP

(57) ABSTRACT

A vehicle is provided with a heating device. The heating device includes an electrically driven heat source and a reflector configured to reflect heat radiation emitted by the heat source in the direction of a passenger compartment of the vehicle. The vehicle further includes a contact protection device which is permeable to radiation so that heat radiation reflected by the reflector or emitted by the heat source radiates into the passenger compartment. The heat source and the reflector are arranged on one side of the contact protection device, and the side is averted from the passenger compartment.

20 Claims, 1 Drawing Sheet

(51) Int. Cl.
*F24H 3/04* (2006.01)
*H05B 3/00* (2006.01)

(58) Field of Classification Search
USPC .......................................................... 392/421
See application file for complete search history.

(56) References Cited

U.S. PATENT DOCUMENTS

| | | | |
|---|---|---|---|
| 3,619,562 A | 11/1971 | Jacobs | |
| 7,248,790 B2 | 7/2007 | Misumi et al. | |
| 8,362,398 B2 * | 1/2013 | Heiden | B60L 1/02 219/202 |
| 9,296,275 B2 * | 3/2016 | Huyghe | B60H 1/2225 |
| 2004/0169027 A1 | 9/2004 | Bohlender et al. | |
| 2015/0291006 A1 * | 10/2015 | Jung | B60H 1/2215 296/97.23 |
| 2016/0167482 A1 * | 6/2016 | Oh | B60H 1/2225 219/202 |

FOREIGN PATENT DOCUMENTS

| | | | | |
|---|---|---|---|---|
| DE | 100 46 216 A1 | 4/2002 | | |
| DE | 10 2011 120 671 A1 | 7/2012 | | |
| DE | 10 2012 205 873 A1 | 10/2013 | | |
| DE | 102012205873 A1 * | 10/2013 | ............... | B60R 1/12 |
| DE | 102014208246 A1 * | 11/2015 | ........... | B60N 2/5635 |
| EP | 0 271 430 A2 | 6/1988 | | |
| JP | 60-249280 A | 12/1985 | | |
| JP | 2008-254489 A | 10/2008 | | |

OTHER PUBLICATIONS

International Search Report (PCT/ISA/210) issued in PCT Application No. PCT/EP2014/064276 dated Oct. 1, 2014 with English translation (Four (4) pages).
German-language Office Action issued in counterpart German Application No. 10 2013 214 550.0 dated Mar. 18, 2014 (Four (4) pages).
Chinese Office Action issued in counterpart Chinese Application No. 201480030481.9 dated Aug. 29, 2016 with English translation (16 pages).
Chinese-language Office Action issued in counterpart Chinese Application No. 201480030481.9 dated Apr. 19, 2017 with English translation (Thirteen (13) pages).

* cited by examiner

VEHICLE WITH A HEATING DEVICE

CROSS REFERENCE TO RELATED APPLICATIONS

This application is a continuation of PCT International Application No. PCT/EP2014/064276, filed Jul. 4, 2014, which claims priority under 35 U.S.C. §119 from German Patent Application No. 10 2013 214 550.0, filed Jul. 25, 2013, the entire disclosures of which are herein expressly incorporated by reference.

BACKGROUND AND SUMMARY OF THE INVENTION

The present invention relates to a vehicle with a heating device.

In some vehicles, such as diesel vehicles or hybrid or electric vehicles for example, the "waste air" produced by individual vehicle components is not sufficient to adequately heat the passenger compartment, at least at low outside temperatures. Therefore, electrical heating devices are used for vehicles of this kind. Electrical heating devices can be divided into "high-temperature heating devices" and "low-temperature heating devices" with respect to their temperature. In high-temperature heating devices, the heat source is at a considerably higher temperature than in low-temperature heating devices. Known low-temperature heating devices are, in particular, panel heaters, such as seat heaters for example.

The object of the invention is to provide a vehicle with a heating device, such as a high temperature heating device.

This and other objects are achieved by a vehicle having a heating device with an electrically operated heat source and a reflector configured to reflect thermal radiation output by the heat source in a direction of a passenger compartment of the vehicle. A contact-protection device is provided, wherein the contact-protection device is permeable to radiation so that the thermal radiation output by the heat source, or reflected by the reflector, is emitted into the passenger compartment. The heat source and the reflector are arranged on a side of the contact-protection device, and the side is averted from the passenger compartment.

For example, a vehicle with a heating device has an electrically operated "heat source". The "heat source" can be designed in the form of a point or sphere or in the form of a line or cylinder. A heating device according to the invention further has a reflector which reflects thermal radiation, which is output by the heat source, in the direction of a passenger compartment of the vehicle or into the passenger compartment.

The vehicle may be, for instance, an electric vehicle or a hybrid vehicle. However, in principle, the invention can also be used in conventional vehicles, e.g., vehicles which are driven purely by an internal combustion engine.

The vehicle further has a "contact-protection device" which is permeable to radiation, so that thermal radiation which is output by the heat source or is reflected by the reflector can be emitted into the passenger compartment. The heat source and the reflector are arranged on a side of the contact-protection device, the side being averted from the passenger compartment.

A heating device of this kind can be used in an extremely wide variety of locations in the vehicle (e.g., motor vehicle), for example, in a footwell region, in or in the region of an instrument panel, of a vehicle door, etc. The reflector ensures that the thermal radiation which is output by the heat source does not enter, for example, the vehicle structure but rather is output into the passenger compartment. The contact-protection device prevents a passenger getting too close to the heat source of the heating device. Thus, burns, for example, are prevented as a result.

The heat source may be, in particular, a high-temperature heat source which has a temperature of more than 100° C., in particular a temperature of more than 150° C. High thermal or heating powers can be achieved with a low installation space requirement with "hot" heat sources of this kind.

According to one embodiment of the invention, a "rearward reflector" is arranged between the heating device and the contact-protection device, or a (rear) side of the contact-protection device, the (rear) side facing the heating device, can be provided with a reflector layer. A rearward reflector of this kind or a reflector layer prevents the contact-protection device from being excessively heated. "Excessively" means that that region of the contact-protection device, which is accessible from the passenger compartment, is so hot that a person may get burnt on it.

According to another embodiment of the invention, provision is made for the reflector of the heating device to reach directly as far as or close to the contact-protection device or the rearward reflector. This ensures that the large majority of the thermal radiation which is produced by the heating device is reflected in the direction of the radiation-permeable region of the contact-protection device and not, for example, into the vehicle structure. Build-ups of heat in the vehicle structure or heat losses to the vehicle structure can be largely avoided or minimized as a result.

In order to further improve the efficiency of the heating device, a thermal insulation layer can be arranged on a side of the reflector, such that the side is averted from the contact-protection device. As a result, the thermal radiation in the direction of the radiation-permeable region of the contact-protection device, that is to say into the passenger compartment, is further improved and heat losses into the vehicle structure are reduced.

The reflector preferably has a curved shape. The reflector is preferably of concave design as viewed from the heat source.

In one example, the reflector can be of parabolic design. When the heat source is arranged in the focal point of the reflector or in a region of the parabolic reflector close to the focal point, said heat source outputs heat virtually in parallel. Therefore, a parabolic reflector can represent a "parallel heat radiator".

In another example, the reflector could also be of elliptical design. When the heat source is arranged in one of the two focal points of the elliptical reflector or in a region which is close to one of the two focal points of the elliptical reflector, the reflector emits the thermal radiation through the other focal point of the elliptical reflector. In other words, a thermal radiation bundle through the other focal point of the elliptical reflector is produced.

In the case of an elliptical reflector, provision may be made for the heat source to be arranged in one of the two focal points and for the other focal point to lie in the region of a partition wall of the contact-protection device. The term "partition wall" is very generally to be understood to mean an element which forms the "boundary" between the passenger compartment region and a trim or the vehicle structure. When one of the two focal points of the elliptical reflector lies in the region of the partition wall, a thermal radiation bundle which emits radiation into the passenger compartment from the partition wall region in the manner of a fan is produced.

In yet another example, the elliptical reflector can be arranged such that the two focal points lie on that side of the contact-protection device which is averted from the passenger compartment, that is to say "behind the partition wall". As a result, the thermal power density in the region of the partition wall, that is to say as far as the boundary in relation to the passenger compartment, is lower, this reducing the risk of burns still further.

In addition, a ventilation device can be provided, said ventilation device blowing air into the passenger compartment from that side of the contact-protection device which is averted from the passenger compartment. A ventilation device of this kind can still further improve the efficiency of the heating device and still further reduce the risk of heat building up in the vehicle structure behind trim elements of the passenger compartment.

Furthermore, a temperature sensor which is connected to an electronics system can be provided, said temperature sensor detecting any build-up of heat, that is to say a situation of a prespecified temperature being exceeded in the region of the heat source, the reflector or the contact-protection device. If a prespecified temperature is exceeded, provision may be made for the electronics system to automatically switch off the heat source or reduce the heating power. The situation of a critical temperature being reached or exceeded can be indicated in the vehicle, for example optically by means of a display device (for example in a combination instrument, a display in the central region of the instrument panel, or the like) and/or acoustically by means of an audio signal.

According to another embodiment of the invention, the contact-protection device has at least one opening for the passage of thermal radiation from the heating device into the passenger compartment. The at least one opening is preferably so small that human appendages, such as a human finger for example, cannot be inserted into the opening.

According to yet another embodiment of the invention, the reflector has a metallic surface. Said reflector can be produced, for example, from aluminum or from another material. The surface is preferably polished, this producing a particularly high degree of reflection.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
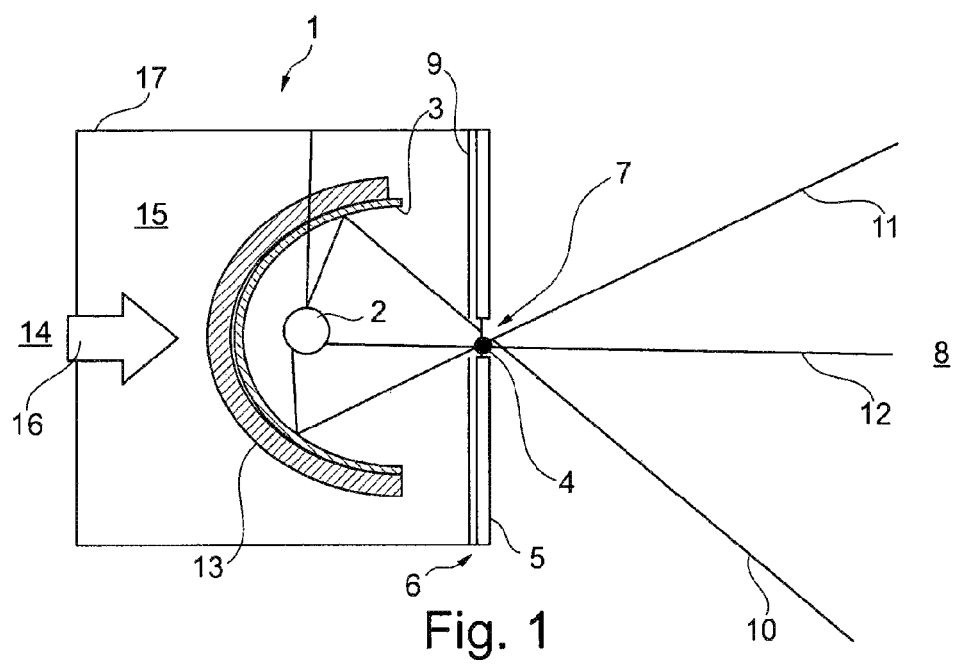
FIG. 1 is a schematic diagram illustrating a first exemplary embodiment according to the invention.

FIG. 1 shows a high-temperature infrared heating device 1 with an electrically operated heat source 2 which is arranged in the region of a left-hand focal point of an elliptical mirror or reflector 3. That side of the mirror or reflector 3 which faces the heat source 2 preferably has a surface with a high degree of reflection, it being possible for this to be achieved, for example, by polishing the surface of the reflector 3. The reflector can be produced entirely from a metal, for example from aluminum, or be coated with a surface which has a high degree of reflection. As an alternative to this, the reflector can also be designed as a mirror, that is to say can be composed of a radiation-permeable material with a reflective rear side.

When the reflector 3, as is the case in the exemplary embodiment of FIG. 1, is of elliptical design and the heat source 2 is arranged in a focal point of the elliptical reflector 3, the reflector 3 emits heat through the second focal point 4 of the elliptical reflector 3. The second or right-hand-side focal point 4 of the elliptical reflector 3 lies in the region of a partition wall 5 of a contact-protection device 6 in this case. The partition wall 5 can be formed, for example, by a trim element of a door trim or the like of a vehicle. The partition wall 5 has a slot 7 or one or more passage openings through which heat from the heating device 1 can be emitted into a passenger compartment 8.

As is clear from FIG. 1, a reflector layer 9 is arranged on a (rear) side of the partition wall 5, which side faces the heating device 1, it being possible for said reflector layer to be formed, for example, by a metal foil or a metal layer which is vapor-deposited onto the rear side of the partition wall 5. The intended purpose of the rearward reflector 9 is to prevent the partition wall 5 from being excessively heated. Any thermal radiation which strikes the rearward reflector 9 is returned to the reflector 3 by said rearward reflector 9.

The beam path from the heat source 2 and the reflector 3 into the passenger compartment 8 is illustrated in FIG. 1 by way of example using two heat rays 10, 11. Further, as illustrated by the thermal beam 12, thermal power can also be emitted into the passenger compartment 8 through the opening 7 directly by the heat source 2.

As is clear from FIG. 1, a rear side of the reflector 3, that is, a side of the reflector 3 which is averted from the contact-protection device 6, is coated with an insulating material 13. As a result, heat losses to a region 14 of a vehicle structure, not illustrated in any detail here, are further reduced.

A further improvement in the energy efficiency of the heating device shown in FIG. 1 can be achieved by a fan which blows air into the passenger compartment 8 through an opening 7 from a region 5 of the heating device, this being schematically indicated by an arrow 16.

It should further be noted that the heating device 1 can be accommodated in a housing 17. The housing 17 can extend directly to a rear side of the contact-protection device 6 or of the partition wall 5. The rearward reflector 9 or the partition wall 5 can also be a constituent part of the housing 17 of the heating device.

The heating device shown in FIG. 1 can be integrated, for example, into an instrument panel, a vehicle door or vehicle trim, an A, B or C pillar trim etc. In particular, the heating device which is shown in FIG. 1 can be arranged in a footwell region of the vehicle.

Figure 2:
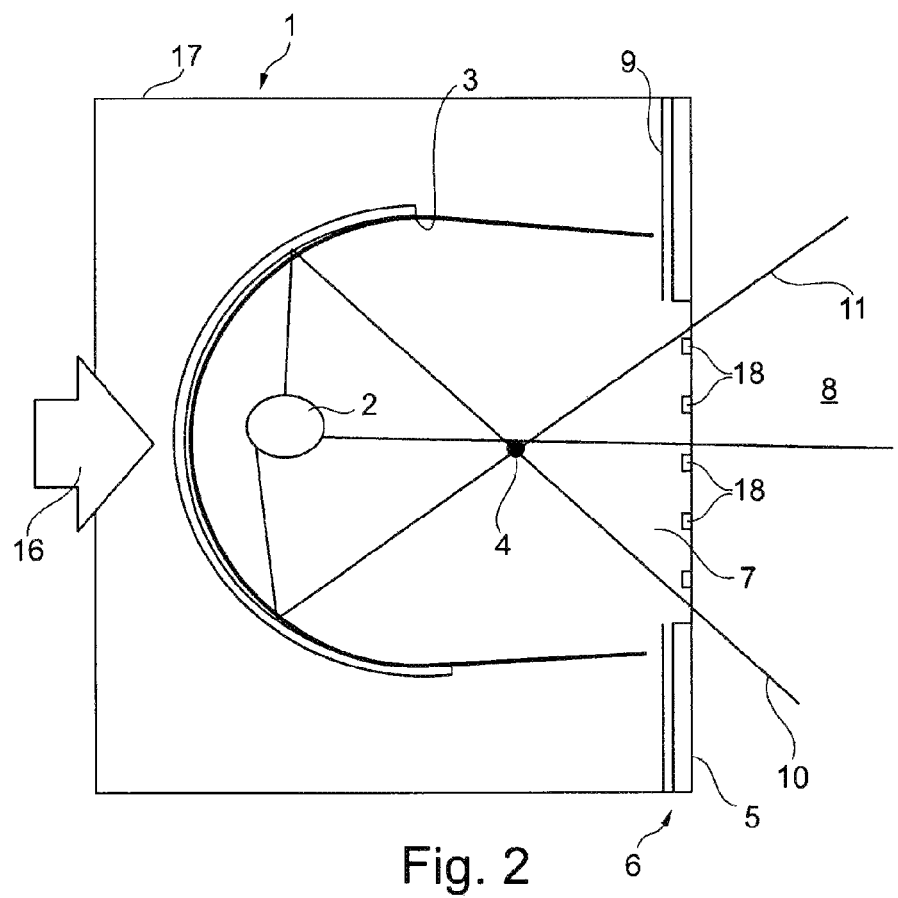
FIG. 2 is a schematic diagram illustrating a second exemplary embodiment of the invention.

FIG. 2 shows an enlarged illustration of a variant of the exemplary embodiment of FIG. 1.

In this exemplary embodiment, the heat source 2 is likewise arranged in the (left-hand-side) focal point of the elliptical reflector 3. In this case, the reflector 3 reaches almost directly as far as the reflector 9, this further improving the efficiency of the output of heat into the passenger compartment 8.

A further difference in the exemplary embodiment of FIG. 2 from the exemplary embodiment in FIG. 1 is that the second or right-hand-side focal point 4 of the elliptical reflector 3 now lies slightly behind the partition wall 5 of the contact-protection device 6, that is, on that side of the partition wall 5 or of the contact-protection device 6 which is averted from the passenger compartment 8. Therefore, the individual heat rays 10, 11 do not intersect in the plane of the partition wall 5, but rather behind the partition wall 5, this producing a heating power density in the region of the partition wall 5 which is lower than in the exemplary embodiment of FIG. 1 and requiring a correspondingly larger passage opening 7 in the partition wall 5 or in the contact-protection device 6. In order to prevent appendages, such as a finger for example, from being inserted into the heating device 1 from the passenger compartment 8 via the passage opening 7, a protective grid 18 is arranged in the region of the passage opening 7 in the exemplary embodiment of FIG. 2.

Contact-protection is improved by the relatively low radiation power density in the region of the partition wall 5.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle, comprising:
   a heating device having:
      an electrically operated heat source and
      a reflector configured to reflect thermal radiation output by the heat source in a direction of a passenger compartment of the vehicle;
   a contact-protection device, wherein the contact-protection device is permeable to radiation so that the thermal radiation output by the heat source, or reflected by the reflector, is emitted into the passenger compartment, wherein the heat source and the reflector are arranged on a side of the contact-protection device, and the side is averted from the passenger compartment; and
   a rearward reflector arranged between the heating device and the contact-protection device, wherein the rearward reflector has a rear side that faces the heating device.

2. The vehicle according to claim 1, wherein the heat source is a high-temperature heat source and has a temperature of more than 100° C.

3. The vehicle according to claim 1, wherein the rearward reflector has a rearward reflector layer.

4. The vehicle according to claim 1, wherein the reflector of the heating device extends toward the contact-protection device.

5. The vehicle according to claim 1, further comprising:
   a thermal insulation layer arranged on a side of the reflector, wherein the side is averted from the contact-protection device.

6. The vehicle according to claim 1, wherein the heat source is designed in the form of a point, a sphere, a line, or a cylinder.

7. The vehicle according to claim 1, wherein a cross section of the reflector is of elliptical design.

8. The vehicle according to claim 1, wherein a cross section of the reflector is of parabolic design.

9. The vehicle according to claim 1, wherein the heat source is arranged at a focal point or on an axis running through a focal point of the reflector.

10. The vehicle according to claim 7, wherein the reflector is arranged such that one of the two focal points lies in the region of a partition wall of the contact-protection device.

11. The vehicle according to claim 7, wherein the reflector is arranged such that the two focal points lie on a side of the contact-protection device, wherein the side is averted from the passenger compartment.

12. The vehicle according to claim 1, further comprising:
   a ventilation device, said ventilation device configured to blow air into the passenger compartment from a side of the contact-protection device, wherein the side is averted from the passenger compartment.

13. The vehicle according to claim 1, wherein the heating device is arranged in a footwell region of the vehicle.

14. The vehicle according to claim 1, wherein the contact-protection device has at least one opening for passage of thermal radiation, wherein the at least one opening is configured so that human appendages cannot be inserted into the opening.

15. The vehicle according to claim 1, wherein the reflector has a metallic surface.

16. The vehicle according to claim 2, wherein the heat source has a temperature of more than 150° C.

17. The vehicle according to claim 15, wherein the metallic surface is polished.

18. The vehicle according to claim 1, wherein the rearward reflector is arranged directly on a rear side of the contact-protection device.

19. A heating system, comprising:
   a heating device having:
      an electrically operated heat source, and
      a reflector configured to reflect thermal radiation output by the heat source in a direction of a passenger compartment of a vehicle;
   a contact-protection device, wherein the contact-protection device is permeable to radiation so that the thermal radiation output by the heat source, or reflected by the reflector, is emitted into the passenger compartment, wherein the heat source and the reflector are arranged on a side of the contact-protection device, and the side is averted from the passenger compartment; and
   a rearward reflector arranged between the heating device and the contact-protection device, wherein the rearward reflector has a rear side that faces the heating device.

20. A method for heating a passenger compartment of a vehicle, the vehicle including a heating device, a contact-protection device, and a rearward reflector, the method comprising the acts of:
   activating an electrically operated heat source of the heating device; and
   reflecting thermal radiation output by the heat source in a direction of the passenger compartment of the vehicle;
   wherein the contact-protection device is permeable to radiation so that the thermal radiation output by the heat source, or reflected, is emitted into the passenger compartment,
   wherein the heat source and the reflector are arranged on a side of the contact-protection device, and the side is averted from the passenger compartment,
   wherein the rearward reflector is arranged between the heating device and the contact-protection device, and
   wherein the rearward reflector has a rear side that faces the heating device.

* * * * *